United States Patent [19]

Hagiwara et al.

[11] Patent Number: 4,876,681
[45] Date of Patent: Oct. 24, 1989

[54] PACKET SWITCHING EQUIPMENT AND A PACKET SWITCHING METHOD FOR CONTROLLING PACKET SWITCHED NETWORKS

[75] Inventors: Masayoshi Hagiwara, Kawasaki; Michio Suzuki, Yokohama; Ryoichi Sasaki, Fujisawa; Minoru Sugano; Akira Horiki, both of Yokohama; Kazuyuki Hayashi, Fujisawa, all of Japan

[73] Assignee: Hitachi, Ltd., Tokyo, Japan

[21] Appl. No.: 194,044

[22] Filed: May 13, 1988

[30] Foreign Application Priority Data

May 15, 1987 [JP] Japan .............................. 62-116805
Jun. 8, 1987 [JP] Japan .............................. 62-141463

[51] Int. Cl.$^4$ ............................................. H04Q 11/04
[52] U.S. Cl. ...................................... 370/60; 370/94.1
[58] Field of Search .................. 370/60, 94, 110.1, 58, 370/13, 16

[56] References Cited

U.S. PATENT DOCUMENTS

| | | | |
|---|---|---|---|
| 3,979,733 | 9/1976 | Fraser ..................................... | 370/60 |
| 4,370,743 | 1/1983 | Moran .................................... | 370/60 |
| 4,380,063 | 4/1983 | Janson et al. .......................... | 370/60 |
| 4,521,882 | 6/1985 | Gabrielli et al. ....................... | 370/94 |

OTHER PUBLICATIONS

C. Wu and T. Feng, "On a Class of Multistage Interconnection Networks", *IEEE Trans, Comput.*, C-29, No. 8, 1980, pp. 694-702.

*Primary Examiner*—Joseph A. Orsino
*Assistant Examiner*—Frank M. Scutch, III
*Attorney, Agent, or Firm*—Fay, Sharpe, Beall, Fagan, Minnich & McKee

[57] ABSTRACT

In order to enable an expansion of a packet switched network and a constitution change thereof to be readily achieved in a multistage switched network constitution, in a packet switched network including a packet data terminal, a packet switching equipment, a PBX, a multiplexer, an LAN, a voice communication apparatus such as a telephone set, and a facsimile or in a linkage between switching modules in a packet switching apparatus, the basic switching modules called configuration units connected to the network are interconnected to each other to form a hierarchic tree structure of which the number of hierarchic levels can be selected depending on a size of the packet switched network. Furthermore, in order to increase the reliability of the packet data transfer in the multi-stage switched network configuration, there are disposed a plurality of connecting lines between bit switches and upper-level configuration units so as to establish a redundant configuration.

6 Claims, 12 Drawing Sheets

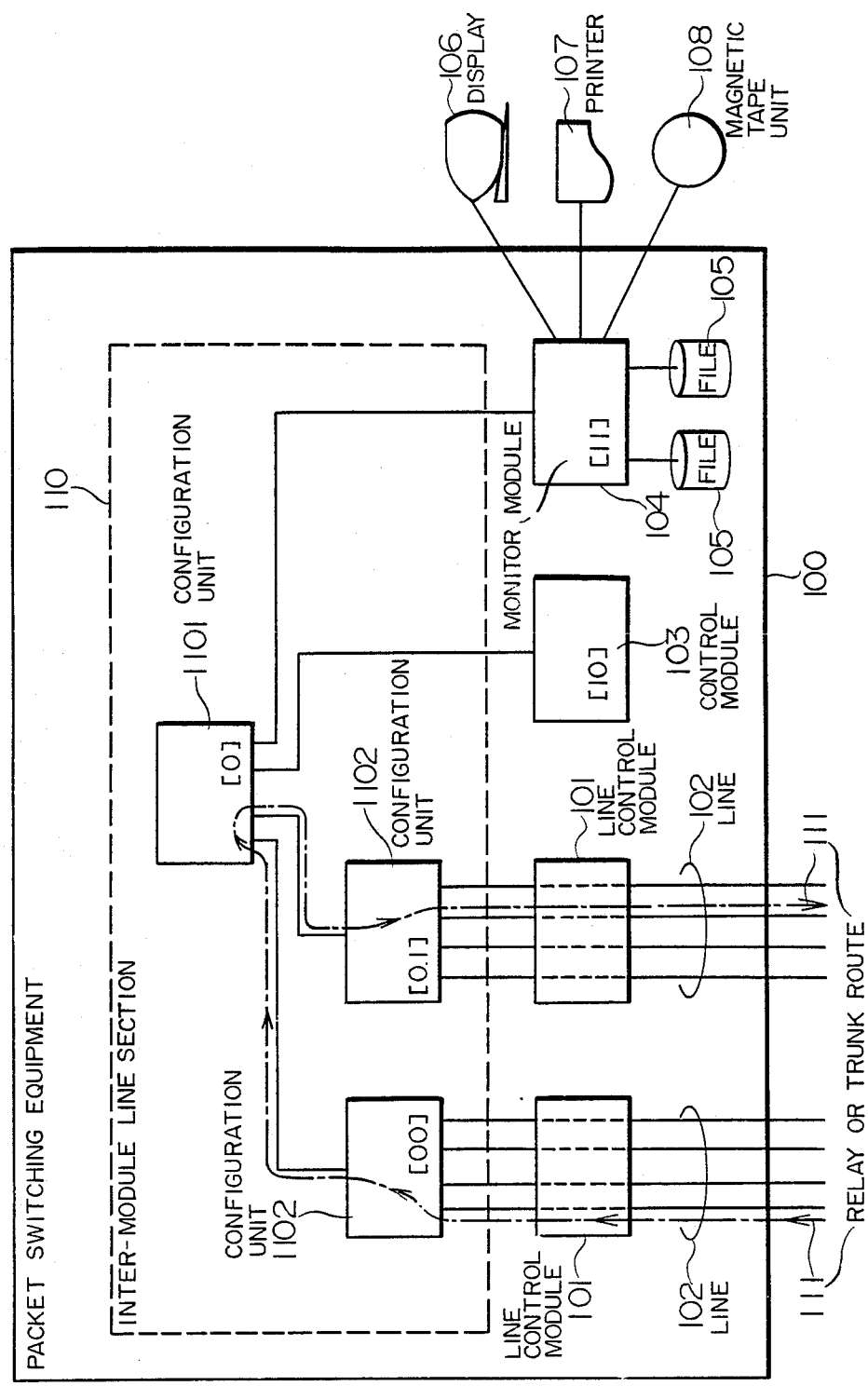

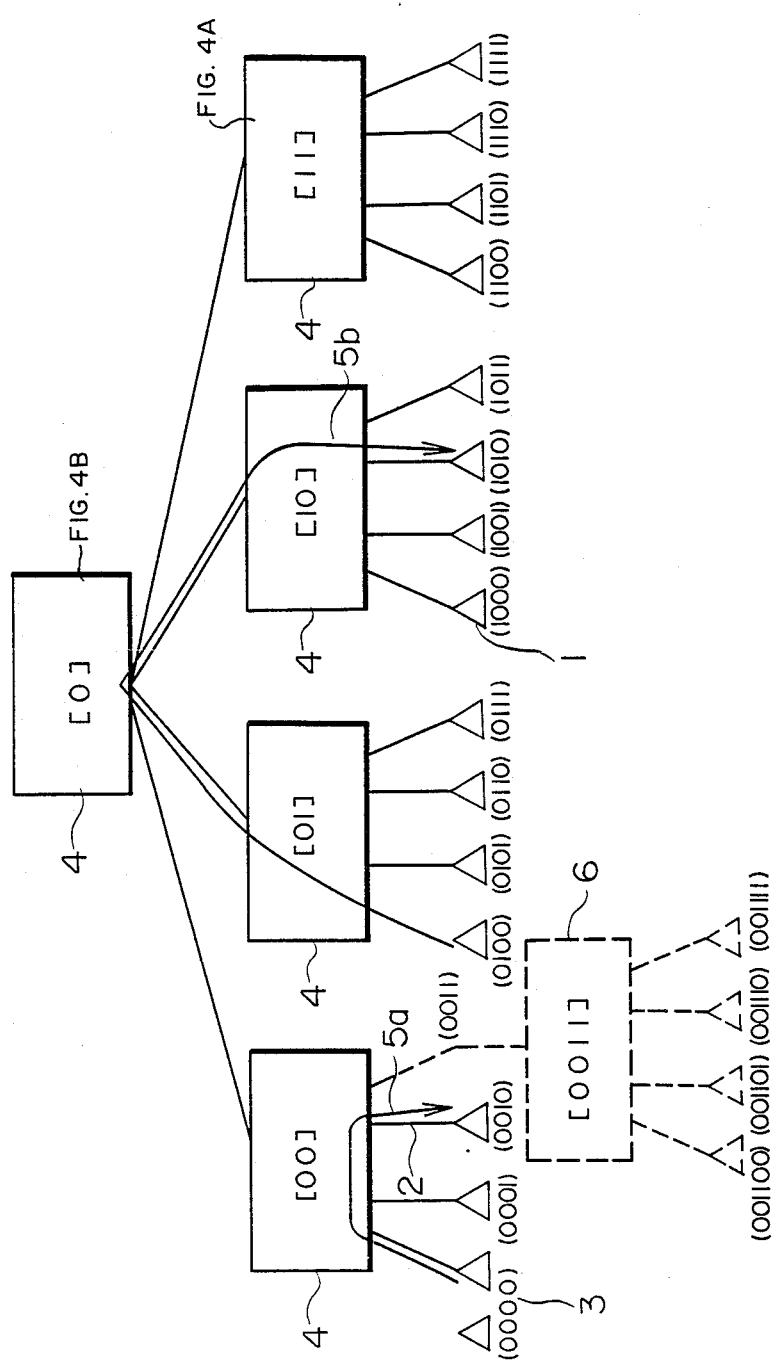

FIG. 2
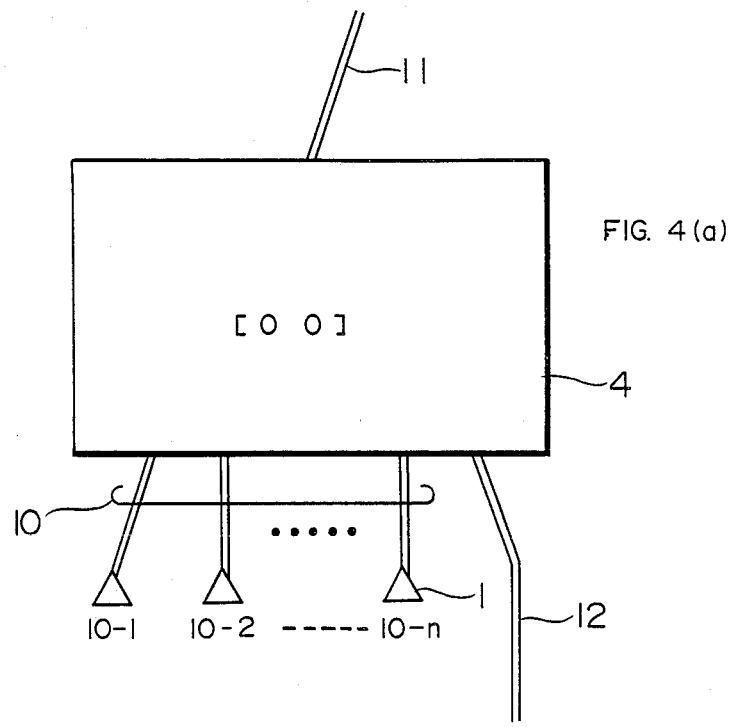
FIG. 4(a)
FIG. 3
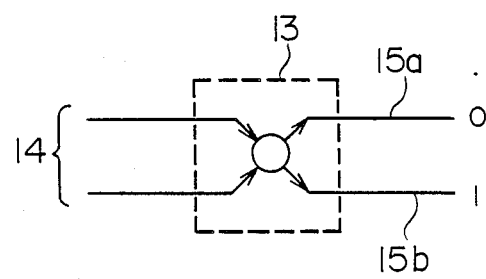

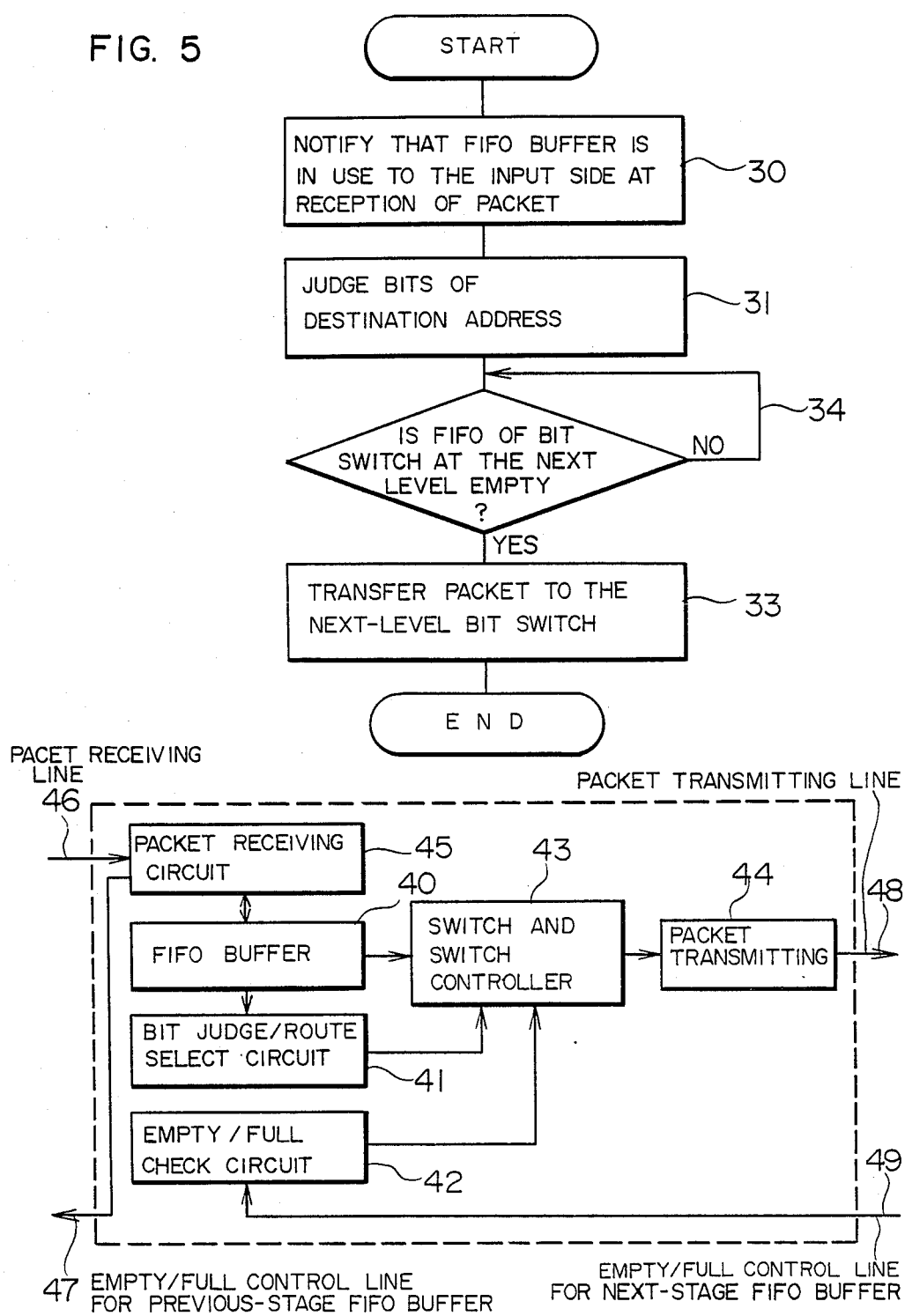

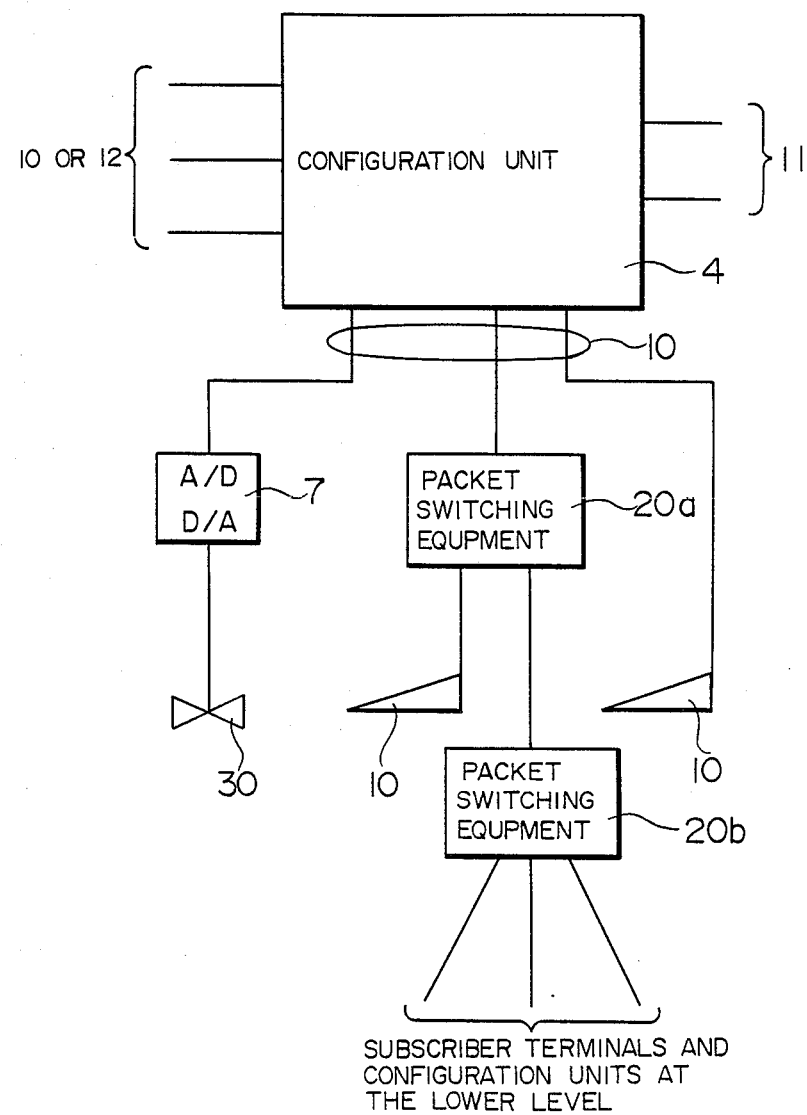

PACKET SWITCHING EQUIPMENT AND A PACKET SWITCHING METHOD FOR CONTROLLING PACKET SWITCHED NETWORKS

BACKGROUND OF THE INVENTION

The present invention relates to a control method and a control apparatus suitably applicable to the constitution of a packet switched network and to a packet transfer.

The packet switching capacity of the present packet switching system is $10^4$ packets per second when the D51-type packet switching equipment of NTT is used, for example.

In the future, with the increase of the amount of information and the development of service functions in the data communication and the expansion of applications of the packet switching operation with respect to new media (such as the image and voice), there will be required a development of a packet switching equipment having a packet switching capacity of about $10^6$ packets per second.

However, according to the fundamental constitution of the prior-art packet switching equipment, there is included a multi-processor configuration comprising a uni-bus, a loop bus, and a system of a memory common connection; furthermore, a complicated software processing is achieved through the communications between processors, namely, inter-processor communications and through the communication control protocol processing. Consequently, since an increase in the packet switching traffic immediately causes a contention with respect to the bus and the memory, there has been a disadvantage that when the number of the processors is increased, namely, when the number of the switching modules is increased, the packet switching capacity is lowered.

On the other hand, when the performance of the system is ultimately emphasized and there is adopted as a coupling or linking system for a high-speed transfer a complete coupling or linking system such as a crossbar switch employed in a line switching system, if the number of the basic switching modules is N, there are required $N^2$ switching elements in the crossbar switch; moreover, in the complete coupling network, it is required to prepare N - 1 input/output ports. This means that the increase in the number N of the modules is disadvantageous with respect to the cost of the system.

Based on the background above, in connection with the processor connecting method for the packet switching equipment coping with the high-speed transfer and the increase of the number of the modules, as described by C. Wu and T. Feng in the "On a Class of Multistage Interconnection Networks", IEEE Trans. Comput., C-29, 8, pp. 694–702 (Aug. 1980), it has been reported to be advantageous to adopt a method including a connecting or coupling system in which the switching modules of the crossbar switch are arranged in a multistage fashion and hence the switch elements are not increased on an order of $N^2$ like in a case where the single-stage configuration is utilized. This multistage crossbar switch configuration is applicable to a connection of 1000 modules or more, and for example, there exists an example of a multistage switch configuration of an omega network adopted in a super computer of the Burroughs (U.S.) including a multistage connection of shuffle-exchanges.

In the multistage switching network configuration like the omega network above, when an expansion of the network is required, for example, to add subscribers, connections must be established between the additional subscribers and the existing subscribers. Namely, a partial expansion of the network is impossible because the symmetric characteristic of the line connection and the address system of addresses to be assigned to the subscribers cannot be sustained (for example, the hardware transfer cannot be effected only with a destination address), and the alteration of the constitution due to the expansion affects the overall network. In particular, when the network size is increased, the number of connecting lines becomes abruptly great, which hence leads to a problem that the expansion and the configuration change of the network cannot be easily carried out and that in the omega network, if the load imposed on each switch element is not uniform, a fluctuation takes place in the packet data so as to cause a problem of a data loss and a data error and there are required a (flow control) apparatus to control the flow of the packet data and a delay of processing for the pertinent control, which prevents the processing speed from being increased.

Next, description will be given of the prior-art technology of the packet transfer control.

At present, the X.25 Recommendation of CCITT has been widely used as the communication control protocol in the packet switched network. According to the X.25 Recommendation, a call is established through a predetermined connection or link control procedure a call initiation terminal and a call destination terminal until a request to disconnect the call is issued. More concretely, the logical channel is represented by packet identification and control information contained in a header portion of a packet, and the software of the packet switching equipment effects a packet transfer along the logical channel based on the information above. For the hardware of the packet switching equipment, there is commonly adopted a method in which a direct memory access (DMA) transfer is conducted via an internal common bus to a communication line determined by the logical channel.

However, in order to achieve a high-speed packet transfer, it is impossible to employ such a method in which the line connection and the transfer control are effected by the software, namely, these functions must be implemented by the hardware.

A high-speed packet transfer control apparatus utilizing hardware switching elements has been described in the U.S. Pat. No. 3,979,733. In this system, there are included transfer control means determining a route of the next stage or level based on the header portion of a received packet and memory means storing internal information to determine the route such that the transfer timing of the next stage is established in synchronism with a time slot attained through a time-sharing operation.

On the other hand, in a packet transfer control apparatus (bit switch system) employing a network constitution, like the omega network, which includes a multistage connection of switching elements and which is called a bit switch, the time-sharing operation is not achieved to control the transfer timing and hence particular means for the synchronization is not necessary. However, if there exists a fluctuation of the traffic due to the packet transfer at the random timing, the load is concentrated on the bit switch, which leads to the second problem that there may arise a blocking of the acket data at the next stage or level, a data loss, and a data error.

SUMMARY OF THE INVENTION

It is therefore a first object of the present invention to provide a control method of and a control apparatus for the packet network configuration in which the expansion of the network and the configuration alteration thereof can be easily achieved in a multistage switching network configuration without changing the addressing system of subscribers indispensable for a high-speed hardware transfer and without greatly increasing the number of lines to be connected.

A second object of the present invention is to provide a control method of and a control apparatus for the packet network configuration which increases the reliability of the packet data transfer using a bit switch in a multistage configuration.

The first object above can be achieved by establishing a network in which packet data terminals, packet switching equipments, and voice communication apparatuses such as telephone sets are connected to a basic switching module called a configuration unit such that the configuration units are interconnected in a hierarchic tree structure for which the number of hierarchic stages or levels can be selected according to the size of the network.

For an execution of a switching operation of packet data, there is disposed a subscriber address for an identification of a terminal of each subscriber such that a subscriber's address of the packet transfer destination is loaded in the header portion of packet data, which enables the configuration unit above to judge the subscriber address.

The switching function of the configuration unit is implemented by a switching element called a bit switch, which effects a judgment of 0 or 1 of a particular bit of input packet data so as to determine as a result of the judgment an output switching route.

The configuration unit operates in accordance with the sequential switching processing of the bit switch; however, the configuration unit is provided with an anterior judge section which transfers the packet to the configuration unit in the next higher stage or level when the destination subscriber of the input packet data is missing in the subscribers contained in the levels lower than the own level and a posterior judge section which functions, when the destination subscriber of the input packet data is found in the subscribers contained in the levels lower than the own level, to effect a judgement so as to determine the destination subscriber or the lower-level configuration unit containing the destination subscriber and finally determines the destination subscriber, thereby transferring the packet thereto.

In the switching processing of the bit switch in the configuration unit, the state of the internal first-in first-out (FIFO) buffer of the bit switch at the next stage or level associated with the transfer destination is monitored by use of a control line, and only when there is found an empty state, the packet data is transferred to the bit switch at the next stage. If the empty state is not found, the packet data is kept remained in the internal FIFO buffer. This provision enables a collision of packet data and a data loss due to an overflow of the buffer to be prevented and hence the appropriate switching and relay operations are guaranteed. Furthermore, when the destination subscriber is determined, the result of the judgement of the bit switch establishes a unique switching route; consequently, there does not occur an inversion of the sequence of packet data items and the packet data can be transferred with a high reliability.

In addition, the second object of the present invention can be achieved by preparing a plurality of connecting lines to the bit switch and the configuration units at the higher levels so as to form a redundant configuration.

In the switching processing of the bit switch in the configuration unit, the state of the internal first-in first-out (FIFO) buffer of the bit switch at the next stage associated with the transfer destination is monitored by use of a control line, and only when there is found an empty state, the packet data is transferred to the bit switch at the next stage. If the empty state is not found, the packet data is kept remained in the internal FIFO buffer. This provision enables a collision of packet data and a data loss due to an overflow of the buffer to be prevented and hence the appropriate switching and relay operations are guaranteed. Furthermore, when the destination subscriber is determined, the result of the judgement of the bit switch establishes a unique switching route; consequently, there does not occur an inversion of the sequence of packet data items and hence a highly reliable packet transfer can be conducted even if the call control is omitted.

BRIEF DESCRIPTION OF THE DRAWINGS

The present invention will be apparent from the following detailed description taken in conjunction with the accompanying drawings in which:

FIG. 1B is an internal constitution diagram of a packet switching equipment according to the present invention;

FIG. 1C is a module constitution diagram of a packet switched network control apparatus according to the present invention;

FIG. 2 is a schematic constitution diagram of a configuration unit of FIG. 1;

FIG. 3 is a constitution diagram of a bit switch implementing a switching function of the configuration unit;

FIG. 5 is a flowchart of a packet data transfer control procedure associated with the bit switches and the schematic hardware diagram of a bit switch;

FIG. 6 is a connection relationship diagram showing connection relationships between the configuration unit and subscribers' units;

DESCRIPTION OF THE PREFERRED EMBODIMENTS

Figure 1A:
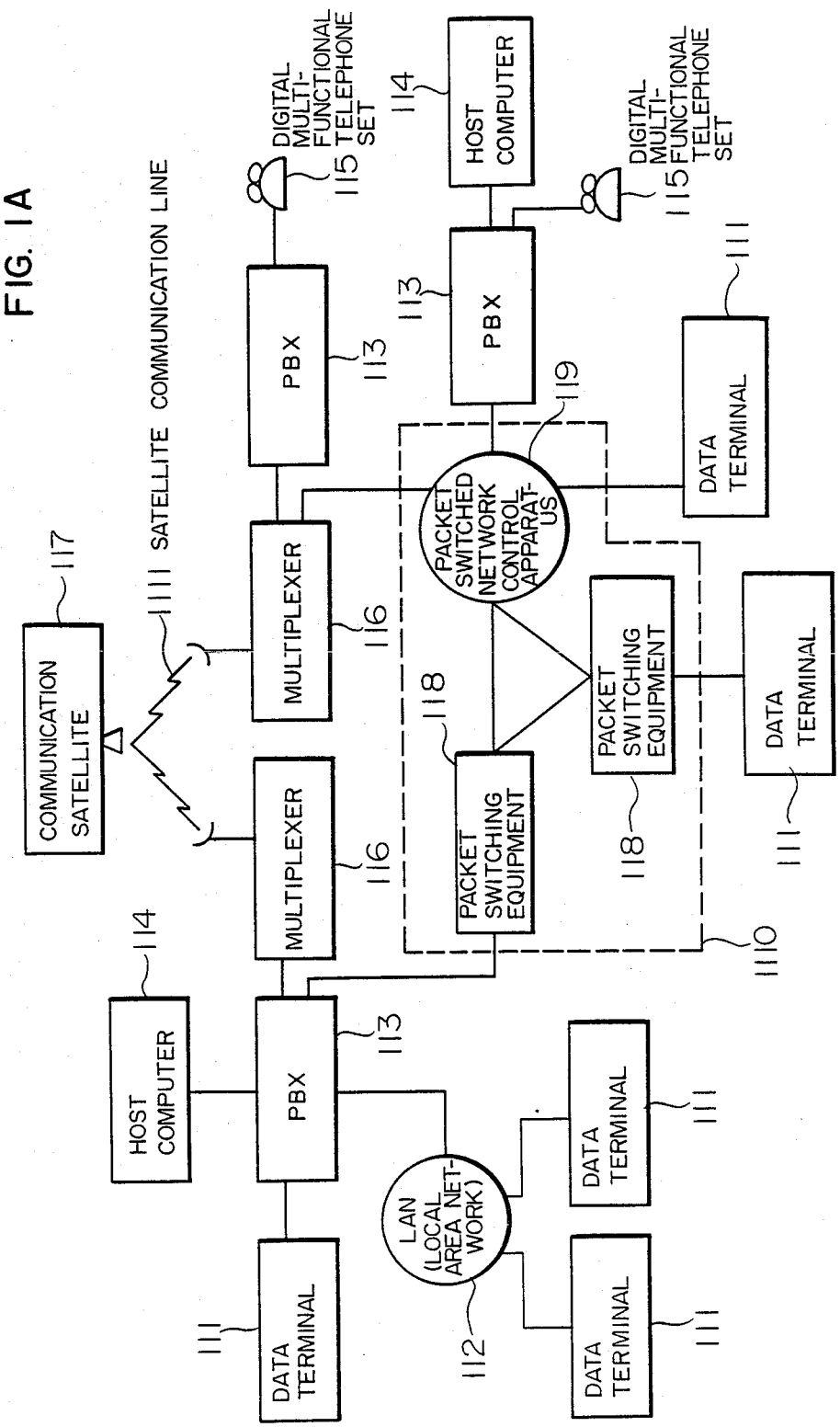
FIG. 1A is an overall constitution diagram of an embodiment of a network according to the present invention.

FIG. 1A shows the position and the overall configuration of the packet switched network control apparatus in the network according to the present invention in which a packet switched network 1110 is connected to data terminals 111, PBXs 113, and multiplexers 116. The multiplexer 116 is linked via the PBX 113 to a digital multi-functional telephone set 115 and a satellite communication line 111; furthermore, there are connected via the PBX 113 a host computer 114, a local area network 112, and the data terminal 111. For the various network configurations above, the packet switched network 1110 treats each network apparatus as a subscriber. That is, the data terminal 1 and the PBX 113 are regarded as the same subscriber such that only a unique subscriber address is assigned thereto for the discrimination thereof in the packet switched network The packet switching equipment 119 according to the present invention is disposed to constitute a portion or all of the packet switched network 1110. However, the packet switching equipment apparatus 119 need not directly use the subscriber address controlled by the packet switching equipment 118, namely, another subscriber address may be employed in the packet switching equipment 119. Consequently, when viewed from the packet switching equipment 119, the packet switching equipment 118 is also treated as a subscriber and hence a unique subscriber address is assigned to the packet switching equipment 118 in the packet switching equipment 119.

Next, description will be given of a case where the present invention is applied to a bus linking or coupling section between modules in a prior art multiprocessor-type packet switching equipment.

FIG. 1B shows the packet switching equipment (corresponding to 118 of FIG. 1) in the multiprocessor configuration to which the present invention is applied. The packet switching equipment 100 includes a line control module 101 controlling the lines at the link level, a control module 103 achieving an upper-level control, and a monitor module effecting an execution control and a data management of the overall packet switching equipment 100. Each component above includes an independent processor. Furthermore, for an interprocessor communication necessary for the data exchange and control between the respective modules, there is disposed a link section for the linkage between the modules. Moreover, the configuration data of the packet switching equipment and various execution data are stored in a file 105 such that the packet switching equipment 100 is externally controlled by connecting as external devices a display 106, a printer 107, and a magnetic tape unit 108.

Figure 10:
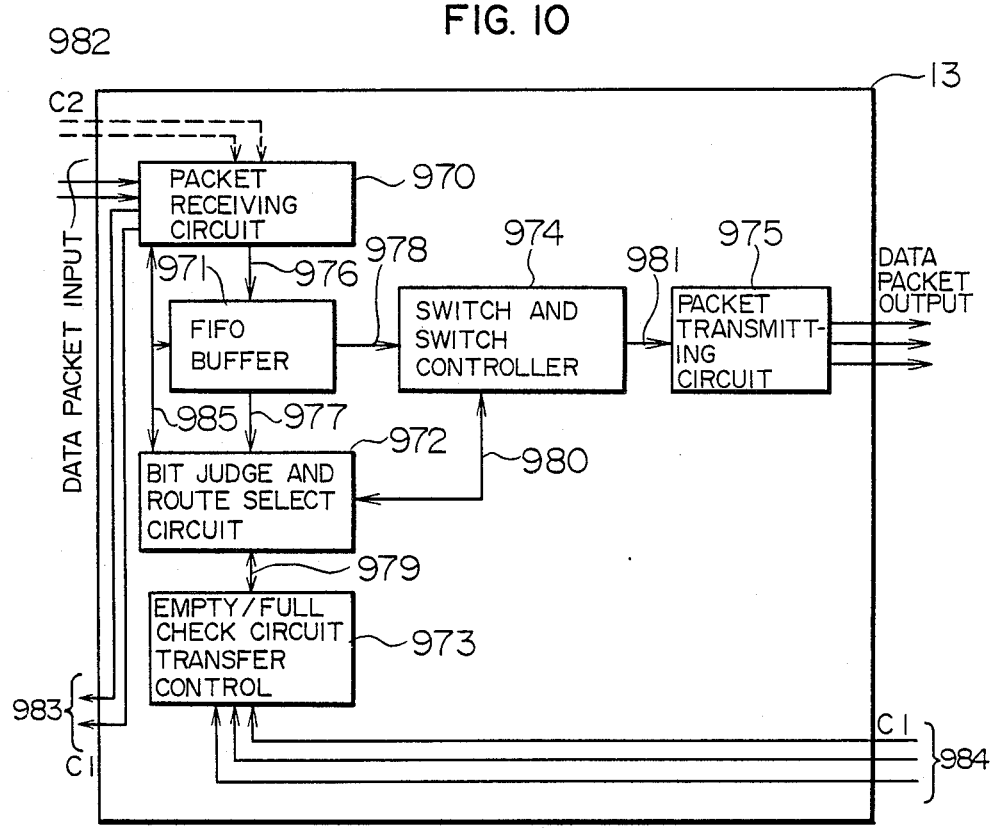
FIG. 10 is a hardware constitution diagram of a bit switch implementing a packet transfer control method.

The conventional packet switching equipment includes the inter-module link section 110 configured with at least one internal bus or an optical loop; however, the configuration of FIG. 10 comprises a hierarchic linkage or connection of configuration units 109 each corresponding to the basic module. Each configuration unit is assigned with a subscriber address, which will be described later. In FIG. 10, there are assigned eight subscriber addresses in total, namely, [$\phi$] to the configuration unit 1101 at the highest level, [00] and [01] to the units 1102 at the second level, and [00] and [01] to the lines 102 (* is 0 or 1). Incidentally, although the control module 103 and the monitor module 104 respectively at the higher levels are not included in the configuration units, subscriber addresses [10] and [11] are assigned thereto according to the levels in the hierarchy.

Assume here that packet data is externally supplied via a relay or trunk route 111. The packet data is then delivered from the line 102 via the line control module 101 to the configuration unit 1102 [00]. Thereafter, the header portion of the packet data is judged so as to be passed via the configuration units [$\phi$] and [01] and again through the line control module 101 to the line.

According to the conventional method to link or connect the modules with a bus, the packet header portion is analyzed by the software processing in the line controller module and then the DMA transfer is initiated so as to pass the data via the bus to the switching and trunking processing.

On the other hand, according to the system of FIG. 10, the packet header portion is judged only through the hardware processing in the configuration unit and then the data is passed to the subscriber address of the destination line.

Next, FIG. 1C shows a module configuration diagram of a packet switched network control apparatus applicable to the two examples above. Here, as described in conjunction with FIG. 1A, it is assumed that such network equipments externally connected to the packet switched network control apparatus as the multiplexers, data terminals, PBXs, host computers, and digital multifunctional telephone sets including the packet switching equipments are to be identified with unique addresses viewed from the packet switched network control apparatus, and the subscriber addresses are indicated in FIG. 1C.

According to the present invention, a subscriber terminal 1 including either a packet data terminal, a packet switching equipment conforming to the CCITT Recommendation X.25 or X.75, or a voice communication apparatus such as a telephone set is connected to a configuration unit corresponding to a basic switching module. The configuration unit 4 is, as shown in FIG. 1C, interconnected to form a tree structure in a hierarchic constitution such that an appropriate number of stages or levels of the hierarchy is selected depending on the size of the network.

A connecting line section 2 between the subscriber terminal 1 and the network is assigned with a subscriber address 3 uniquely determined in the network for the identification of the subscriber terminal. For the transfer destination of packet data, the configuration unit 4 judges the subscriber address 3 so as to determine the switching route.

The subscriber address 3 is assigned such that four configuration units 4 connected to the subscriber terminal form a group and the length of the subsciber address 3 is determined according to the number of levels of the hierarchic constitution of configuration units. For example, the two-digit number (two bits) associated with the configuration unit indicate that the configuration unit 4 is linked to subscriber terminals at the lower level, two high-order bits of the subscriber address being identical to the two digits constituting the number.

Namely, the subscriber terminals of which the two high-order bits of the respective subscriber addresses are equal to each other are grouped so as to be connected to the configuration unit.

In FIG. 1C, the packet switching between the subscriber terminals is achieved such that the configuration units 4 judge the destination subscriber address specified in the header portion of the packet data so as to determine at the respective hierarchic level whether or not the destination subscriber terminal is found in a group of the subscriber terminals belonging to the pertinent configuration unit 4. That is, the switching route or path of the packet data is determined as a route 5a or 5b.

In a case where a new subscriber terminal is required to be accommodated in the network associated with configuration of FIG. 1C, for example, a new configuration unit 6 is connected to a communication line which belongs t the existing lowest-level configuration unit 4 and to which a subscriber terminal is not connected so as to accommodate the new subscriber terminal in the configuration unit 6. In consequence, a subscriber address assigned to the new subscriber terminal is formed by adding, to the subscriber address (0 0 . . . ) (. . . indicates arbitrary bit strings each having an arbitrary length) contained in the existing configuration unit 4, two digits for an identification of the subscriber terminal accommodated in the new configuration unit 6 so as to attain an address (0 0 1 1 . . . ). As described above, for an addition of a new subscriber terminal and a connection change for a subscriber terminal, the relationships of line connections and the subscriber addresses in the existing constitution range need not be changed and hence an expansion and a change can be effected for each configuration unit without any limitation. Incidentally, as a connecting line of the new configuration unit thus added to the existing constitution for the accommodation of the new subscriber terminal, the line of the existing configuration unit at the lowest level need not necessarily be employed. Moreover, the number of subscriber terminals which can be connected to each configuration unit is not restricted. For example, each configuration unit of FIGS. 1A to 1C accommodates $2^2=4$ subscriber terminals; however, if three configuration units are employed, $2^3=8$ subscriber terminals can be accommodated. In general, by use of $4^0+4^1+4^2+\ldots+4^{n-1}=(4n1)/(4-1)$ configuration units, there can be arranged configuration units to accommodate 4 subscriber terminals (n=number of hierarchic levels). This is because the hierarchic level can be established in a unit of the configuration unit.

FIG. 2 shows a schematic diagram of the configuration unit 4, which includes a plurality of subscriber terminal connecting lines 10 (10-1, 10-2, . . . 10-n), a connecting line 11 to a configuration unit at the upper or higher level, and a connecting line 12 to a configuration unit at the lower level. Incidentally, the configuration unit at the highest hierarchic level is not provided with a connecting line to a configuration unit at the further higher level.

Figure 4A:
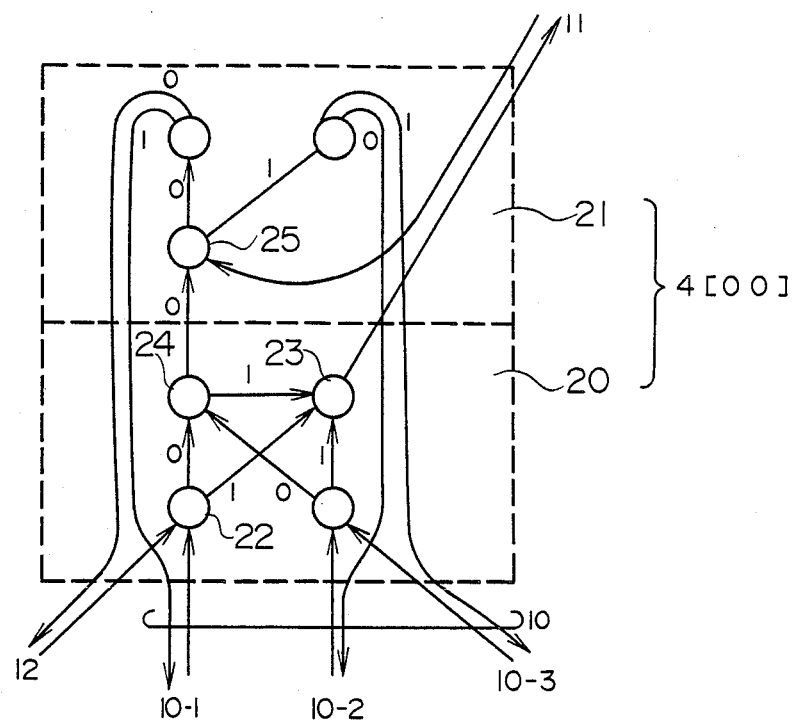
FIG. 4A is a connection configuration diagram of bit switches in a configuration unit at the second stage or level relative to the upper-most stage or level of the hierarchy.

FIG. 3 shows a diagram of a switching element called a bit switch implementing the switching function of the configuration unit. This bit switch 13 has commonly been known also as a switching element employed in the omega network in which the conventional shuffle exchange is developed into a multistage configuration and judges 0 and 1 of a particular bit of input data to effect a switching operation based on the result of the judgement, thereby distributing the input data. For example, a particular bit of the subscriber address contained in the input data packet 14 of FIG. 3 is judged and the data packet is delivered to output lines 15a or 15b depending on the bit is 0 or 1, respectively, FIG. 4A shows a connection configuration of a bit switch located in the configuration unit 4. The configuration unit 4 comprises an anterior judge section 20 for extracting the packet data to be transferred via a configuration unit at the upper hierarchic level and a posterior judge section 21 for distributing the packet data to a subscriber terminal connected to a configuration unit at the lower hierarchic level or connected to the pertinent configuration unit 4. FIG. 4A shows internal connections of the configuration unit 4 associated with bit switches at the second level relative to the highest hierarchic level. The internal connections of the configuration unit vary as described above because the number of judgements of the subscriber address in the anterior judge section becomes to be greater for the configuration unit at the lower hierarchic level and the anterior judge section has a different connection depending on the hierarchic level.

Figure 4B:
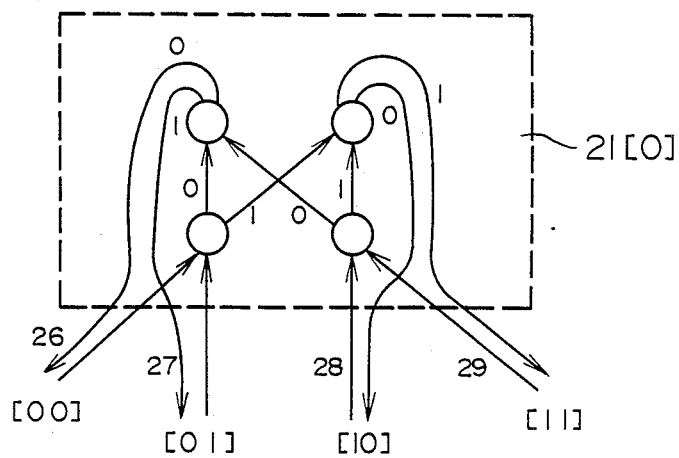
FIG. 4B is a connection configuration diagram of a bit switch in a configuration unit at the uppermost stage.

FIG. 4B shows an internal connection of the configuration unit associated with bit switches at the highest hierarchic level of FIGS. 1A to 1C in which there is functionally missing the anterior judge section and the posterior judge section is included so as to effect only a distribution of packet data to a configuration unit at the lower hierarchic level.

Referring next to FIG. 4A, description will be given of a switching method of actual packet data. Assume here that packet data is inputted via a configuration unit (or a subscriber terminal) at the lower level connected to a connecting line 12 selected from the four routes 12, 10-1, 10-2, and 10-3 extending downward in FIG. 4A. The packet data is first supplied to a bit switch 22 of the anterior judge section 20, which in turn judges to determine whether the packet data is to be delivered to a configuration unit at the upper level. In other words, the first bit (upper-most bit) of the subscriber address contained in the header portion is 1, the packet data is to be transferred to a higherlevel configuration unit and hence is outputted via the bit switch 23 to the connecting line 11. On the other hand, if the first bit is 0, the bit switch 24 subsequently judges to determine whether the second bit is 0 or 1. If the bit is 1, the packet data is to be similarly transferred to a higher-level configuration unit and hence is outputted via the bit switch 23 to the connecting line 11. If the second bit is found to be 0 for the packet data, namely, the packet data is not to be delivered to a high-level configuration unit and hence is inputted via the bit switch 24 to the posterior judge section 21 of the configuration unit, which in turn effects a judgement to determine one of the four lines which is associated with the lower-level configuration units and to which the packet data is transferred, thereby distributing the packet data to the destination.

More concretely, when packet data having a destination subscriber address [0100 . . . ] is inputted from the connecting line 12 of the four routes extending downward in FIG. 4A, the anterior judge section achieves a judgement on the two underlined bits of [0 1 0 0 . : . ] from the left to the right and then transfers the packet data via the bit switch 23 to a configuration unit at the higher level. Furthermore, if the destination subscriber address is [0010 . . . ], the anterior judge section achieves a judgement on the two underlined bits of [0 0 1 0 . . . ]

from the left to the right and sends the packet data to the bit switch 25 of the posterior judge section. The posterior judge section then conducts a judgement on the two underlined bits of [0 0 1 0 . . . ] from the left to the right and transfers the packet data to the connecting line 10-2 associated with a lower-level configuration unit accommodating a set of subscriber terminals having a subscriber address [0010 . . . ].

Similarly, the switching method concerning the configuration unit at the highest level of FIG. 4B is as follows. The first and second bits of the subscriber address contained in the header portion of packet data transferred via one of four lines connected to configuration units at the lower level are judged such that the packet data is transferred to the connecting lines 26, 27, 28, and 29 when the destination subscriber address is [00 . . . ], [01 . . . ], [10 . . .], and [11 . . . ], respectively.

With respect to the processing speed of the packet switching operation, when compared with the conventional software processing method in which the judgement of the packet type and the call control are effected depending on the packet header portion, since the bit judgement of the destination subscriber address contained in the packet header is conducted by the hardware so as to uniquely determine a switching route at a high speed, thereby omitting the call control software processing such as a sequence control processing to be required when the sequence of packet data arrival is inverted.

FIG. 5A is a flowchart of a packet data control procedure of the above described bit switch, and FIG. 5B is a hardware blockdiagram of the above-described bit switch.

In the packet switching equipment of the present invention, there is a bit switch to which the load is concentrated for transferring packets to upper level configuration unit such as the bit switch 23 which is included in the anterior judge section 20 of the configurating unit in FIG. 4A. Such bit switch, e.g., switch 23, has been described in the above "bit switch" like other bit switches, e.g., switches 22, 24, and 25, however, the bit switch such as the sit switch 23 is a mere multiplexing element (hereinafter referred referred to as multiplex big switch), and is different from the bit switches 22, 24, and 25 in this respect.

As described above, the upper the level of configuration becomes, the more the concentration of load to a specified bit switch, e.g., switch 23 occurs. Therefore, in order to prevent from blocking and loss of packet data, a control of bit switch becomes necessary.

In order to carry out such control, the bit switch according to the present invention, e.g., the bit switch 24 in FIG. 4A is constructed with a FIFO buffer 40, bit judge/route select circuit 41, empty/full check circuit 42, switch and switch controller 43, packet transmitting circuit 44, and packet receiving circuit 45.

First, when the packet receiving circuit 45 receives a packet from the preceding bit switch, e.g., switch 22 in FIG. 4A, through the packet receiving line 46, the circuit 45 sends out a control signal ("on" signal) showing that the FIFO buffer 40 is bust to bit switches (the bit switch 22 and the bit switch connected to the line 214) at the input side of the bit switch (24) by using the empty/full check line 47. In the input side bit switches, it is so made that the packet is not transferred during the time in which the control signal is "on", therefore, it is possible to prevent the collision of packet data on the FIFO buffer 40.

Next, it is judged whether a specific address bit of received packet is "0" or "1" (step 31). The empty/full check circuit 42 monitors always a control signal as described above, which signal is either "on" or "off", from the bit switch which is determined to be a destination bit switch by the result of the judgement in the bit judge select circuit 41. The switch and switch controller 43 judges whether the control signal is "on" or "off" as a result of monitoring of the check circuit 42 (step 34), and if the control circuit is "off", the controller 42 controls to transfer the received packet to the destination bit switch, e.g., switch 23 or 25 in FIG. 4A (step 33).

It is apparent that it is not necessary to provide the above described judge/route select circuit 42 in the bit switch 23, since it is not necessary for the bit switch 23 to detect the address of the packet.

Further, when the FIFO buffer of the destination bit switch is busy (control signal is "on"), the bit switch reserves the received packet in a FIFO buffer therein and waits for that the destination bit switch becomes free as described for step 34. When a plurality of bit switches, e.g., bit switches 22 and 24 in FIG. 4A, which switches are connected to one multiplex bit switch, e.g., switch 23 in FIG. 4A, it is so made that the multiplex bit switch (23) selects the bit switch to which the contents of the control signal are made "off" impartially, that is, one after the other.

Further, in FIG. 5B, for the sake of convenience of description only one line of empty/full control line 47 is described. However, it is apparent that in the bit switch such a bit switch 22 or 24 etc. for which there are two bit switches at the input side thereof, substantially two control lines 47 are provided.

FIG. 6 shows connection relationships between the configuration unit 4 in the packet switched network constitution method according to the present invention and the existing packet data terminals 10, a packet switching equipment 20a, and subscriber terminals such as a voice communication apparatus 30 including a telephone set. Namely, the packet data terminal 10 includes an internal function to assemble input data into a packet format and to disassemble a packet into data items according to the present invention and is hence directly connected to the configuration unit 4. For example, in the conventional packet switching equipments such as a switching equipment 20a conforming to the X.25 Recommendation of CCITT and a packet terminal 10 and a packet switching equipment (packet switched network) 20b respectively connected to the switching equipment 20a, the packet switching between X.25 subscriber terminals and the connection between networks are effected through an equivalent exchange between the X.25 packet format and the input data. This is enabled because the address system of X.25 is established outside the subscriber address system of the packet network configuration method according to the present invention. The voice communication apparatus 30 such as a telephone set is connected to the configuration unit via means 7 including an A/D and D/A converter, a packet assemble function, and the like.

Figure 7:
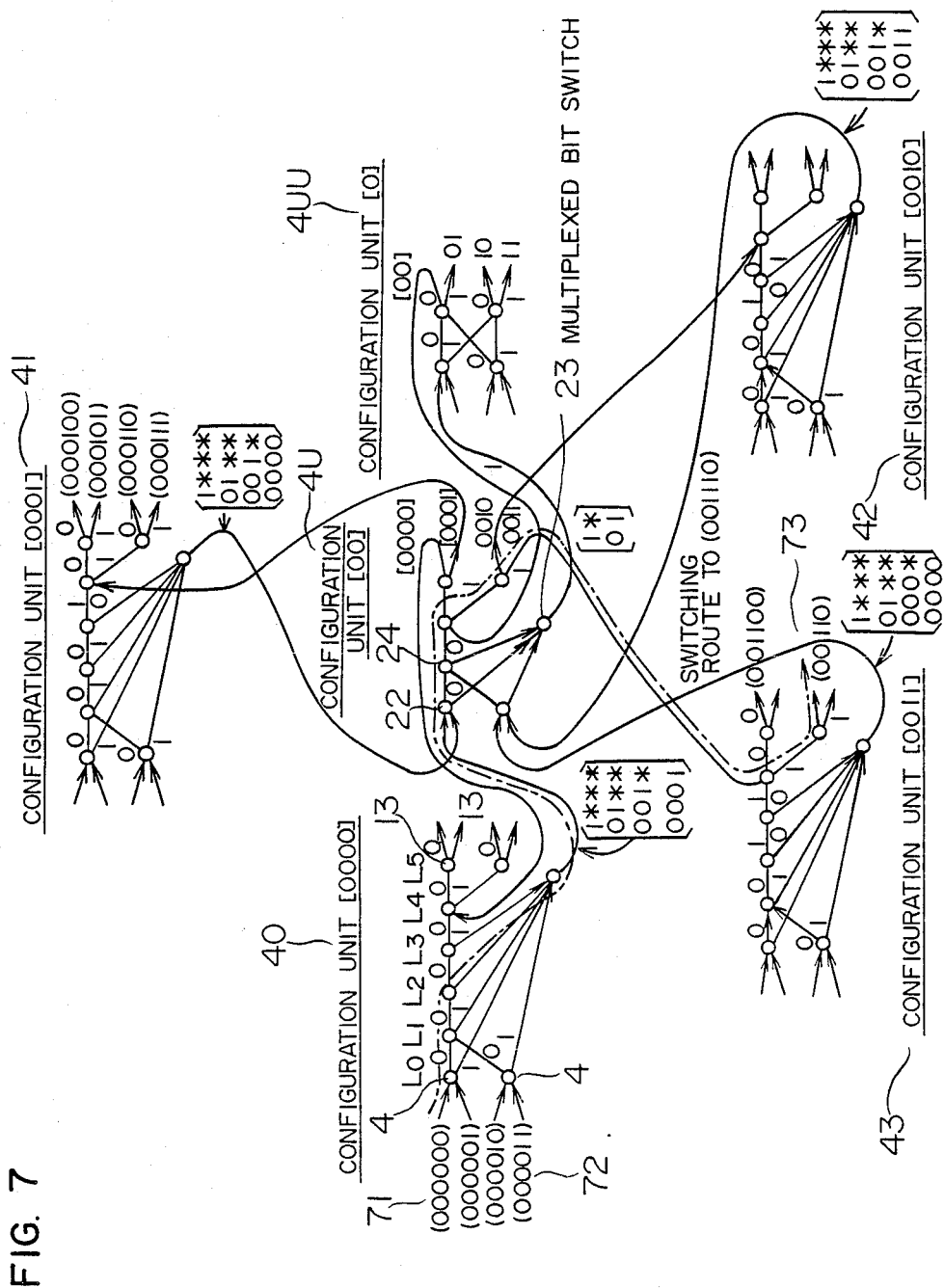
FIG. 7 is an explanatory diagram useful to explain the overall packet switching operation in the network configuration system according to the present invention.

FIG. 7 shows interrelationships between the configuration units including connections of the bit switches located therein in association with the overall configuration of FIG. 1. The address assigned to the respective configuration unit indicates a set of subscriber addresses of subscriber terminals accommodated at the lower level of the configuration unit. Namely, a configuration unit [0010] accommodates at the lower level the subscribers (0010 . . . ) (. . . is an address having an arbitrary bit length). Furthermore, a configuration unit [φ] is arranged at the highest level in the hierarchic structure and hence accommodates all subscribers in the network. However, the identifications or names assigned to the configuration units do not restrict the method of assigning the subscriber addresses of the subscribers to be accommodated. (This is because the subscriber address can take an arbitrary length.)

Referring now to FIG. 7, description will be given of the overall operation of the packet switching. Assume here, for example, that a subscriber 71 having a subscriber address (000000) sends a packet to a subscriber 72 with a subscriber address (000011). Since the uppermost bit is 0 in the destination subscriber address (000011) associated with the level of the bit switch L0 belonging to the configuration unit 4 connected to the subscriber address (000000), the packet is outputted to the level of the bit switch L1 for which the bit 0 is found by the bit judgement. Next, since the second bit relative to the upper-most bit is 0 in (000011) for the bit switch of the L1 level, the packet is delivered to the level of the bit switch L2 associated with the 0 result of the bit judgement. Subsequently, the third and fourth bits are sequentially judged in the similar fashion so as to send the packet to the bit switch at the next level according to the judgement result. As a result, for the subscriber address with a length of six bits, the packet can be transferred to the destination subscriber through at least five levels of bit switches.

Next, assume that the subscriber 71 (000000) transmits a packet to a subscriber 73 (001110). In this case, the same route is employed to pass the packet up to the level of the bit switch L2 belonging to the configuration unit 40 [0000]. The third bit of the destination subscriber address (001110) is then checked so as to decide that the packet destination is other than the subscriber terminals accommodated by the pertinent configuration unit 40 [0000]. As a result, the packet is outputted to a configuration unit 44 [00] at the higher level so as to be judged in the anterior judge section thereof to determine whether or not the destination subscriber is found in the subscriber terminals (00 ... ...) accommodated therein. Namely, the four high-order bits of the packet header are sequentially checked to determined whether or not the destination subscriber belongs to the configuration units 40 [0000], 41 (0001), 42 [0010], and 43 [0011]. If this is the case, the packet is sent to the posterior judge section of the pertinent configuration unit; otherwise, the packet is transferred to a configuration unit 4UU [φ] at the further higher level. In this fashion, the anterior judge section of each configuration unit judges to determine whether or not the destination subscriber is found in the subscribers accommodated therein. If the destination subscriber is not found, the packet is transferred to the anterior judge section of the configuration unit at the higher hierarchic level so as to effect a check for the existence of the destination subscriber again. When the destination subscriber is found in a configuration unit, the posterior judge section of the configuration unit effects a judgement to determine a configuration unit which accommodates the destination subscriber and which is at the lowest level among those accommodating the destination subscriber. The destination subscriber is finally determined by a sequential judgement through the posterior judge section of the respective configuration units at the lower level.

Returning now to the example of the destination subscriber 73 (001110), the anterior judge section of the configuration unit 40 [00]transfers the packet to the configuration unit 43 [0011]based on the judgement result of the four high-order bits, and then the posterior judge section effects a judgement of the fifth and sixth bits of (00111 0) so as to transfer the packet to the destination subscriber 73 (001110).

According to the embodiment, there are disposed an anterior judge section which transfers a packet, when the destination subscriber is not found in the subscribers accommodated in the pertinent configuration unit, to a configuration unit at the next higher level for the subsequent judgement of the destination subscriber and a posterior judge section which judges, when the destination subscriber is found in the subscribers accommodated by the configuration unit, the destination subscriber or a configuration unit at the lower level accommodating the destination subscriber so as to finally determine the destination subscriber and sends the packet to the destination subscriber. Consequently, for example, for the telephone communications and the like having a high traffic between locations apart from each other by a short distance, when compared with a network constitution method, like the conventional omega network, in which the same number of judgement and switching operations are accomplished for any destination subscriber to effect the packet transfer, the number of configuration units through which the packet is transferred can be reduced and hence the number of judgement and switching operations can be minimized, which decreases the transfer delay. In addition, the number of digits of a subscriber address identifying a destination subscriber and the definition method thereof are not restricted and consequently the addition of a configuration unit and a configuration change can be readily achieved only by an increase in the number of digits of the subscriber address and the definition change.

Next, referring now to FIGS. 8, 9A, and 9B, description will be given of a control method and a schematic hardware diagram of bit switches associated with a second embodiment according to the present invention.

In contrast with the transfer in the conventional network like the omega network in which the load is uniformly imposed on the respective bit switches (switching elements), according to the packet transfer in the packet network configuration method of the present invention, a concentration of load may take place, for example, packets to be transferred to a configuration unit at the higher level may be concentrated in a bit switch 23 located in the anterior judge section of the configuration unit of FIG. 4A. The concentration of the load may possibly take place more frequently in a configuration unit at the higher level. Consequently, a bit switch control is required to prevent the deterioration of the reliability of data due to a data blocking, a packet data loss, and a packet data error.

Figure 4C:
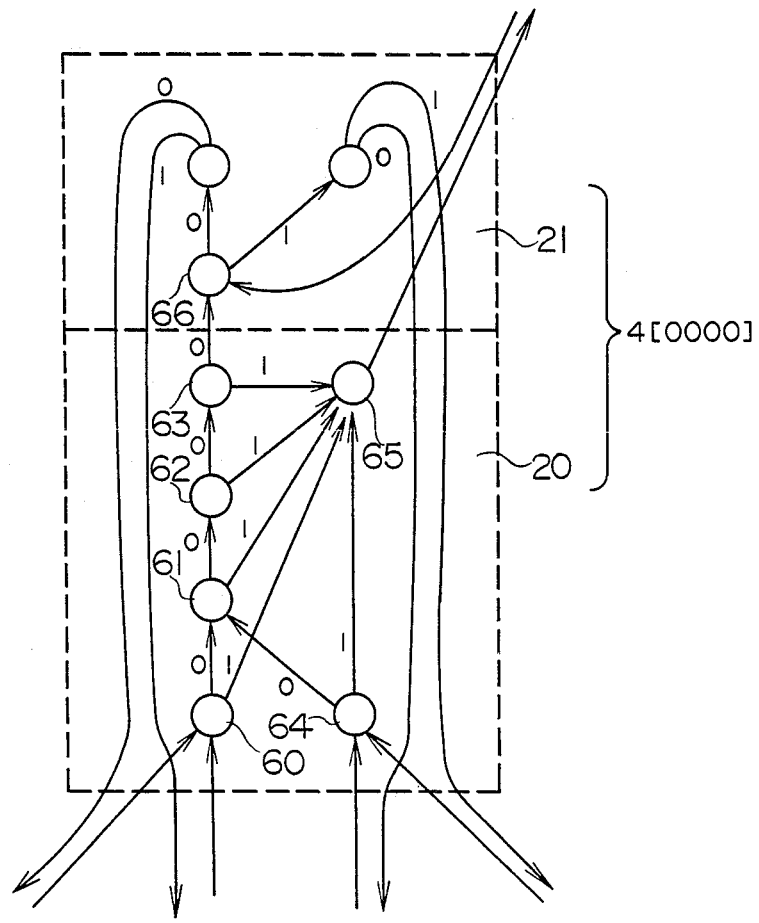
FIG. 4C is a connection configuration diagram of a bit switch in a configuration unit at the third stage relative to the upper-most stage.

FIG. 4C shows internal connections of the bit switches in a configuration unit employed at the third level relative to the highest hierarchic level of FIGS. 1A to 1C. The concentration of load and hence the blocking of the data packet may possibly occur in a bit switch 65.

Figure 8:
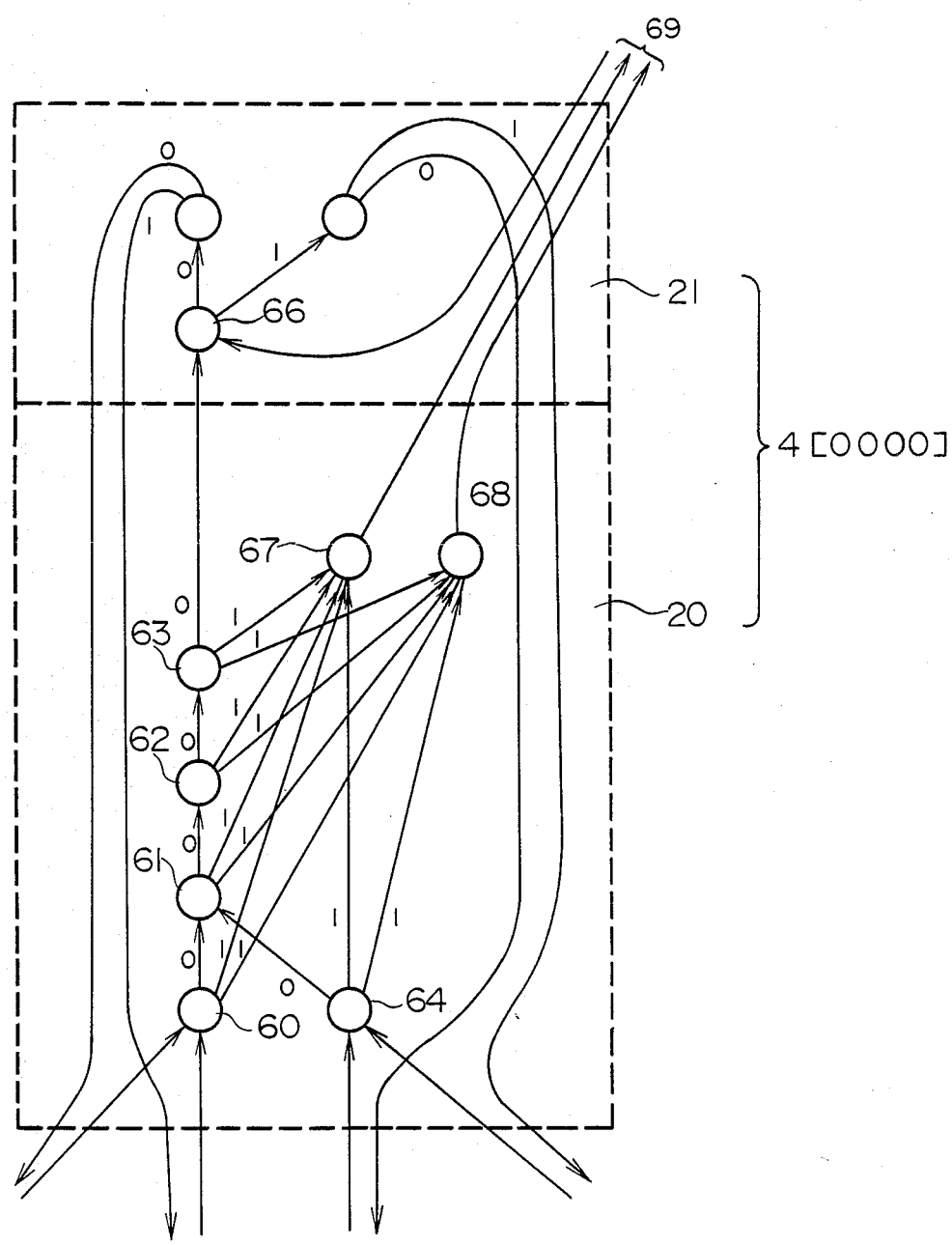
FIG. 8 is a connection configuration diagram of bit switches in a configuration unit at the third stage relative to the upper-most stage to which the packet transfer control method according to the present invention is applied.

FIG. 8 is a connection diagram in which two bit switches 67 and 68 are arranged, in order to minimize the concentration of load on the configuration unit of FIG. 4C and to cope with the data packet blocking and the deterioration of the data reliability, in place of the bit switch 65 associated with the concentration of load so as to duplicate the connecting lines to the configuration unit at the higher level.

Next, referring to FIG. 8, description will be given of a transfer control method of bit switches to cope with the data packet blocking and the deterioration of data reliability according to the present invention.

Figure 9A:
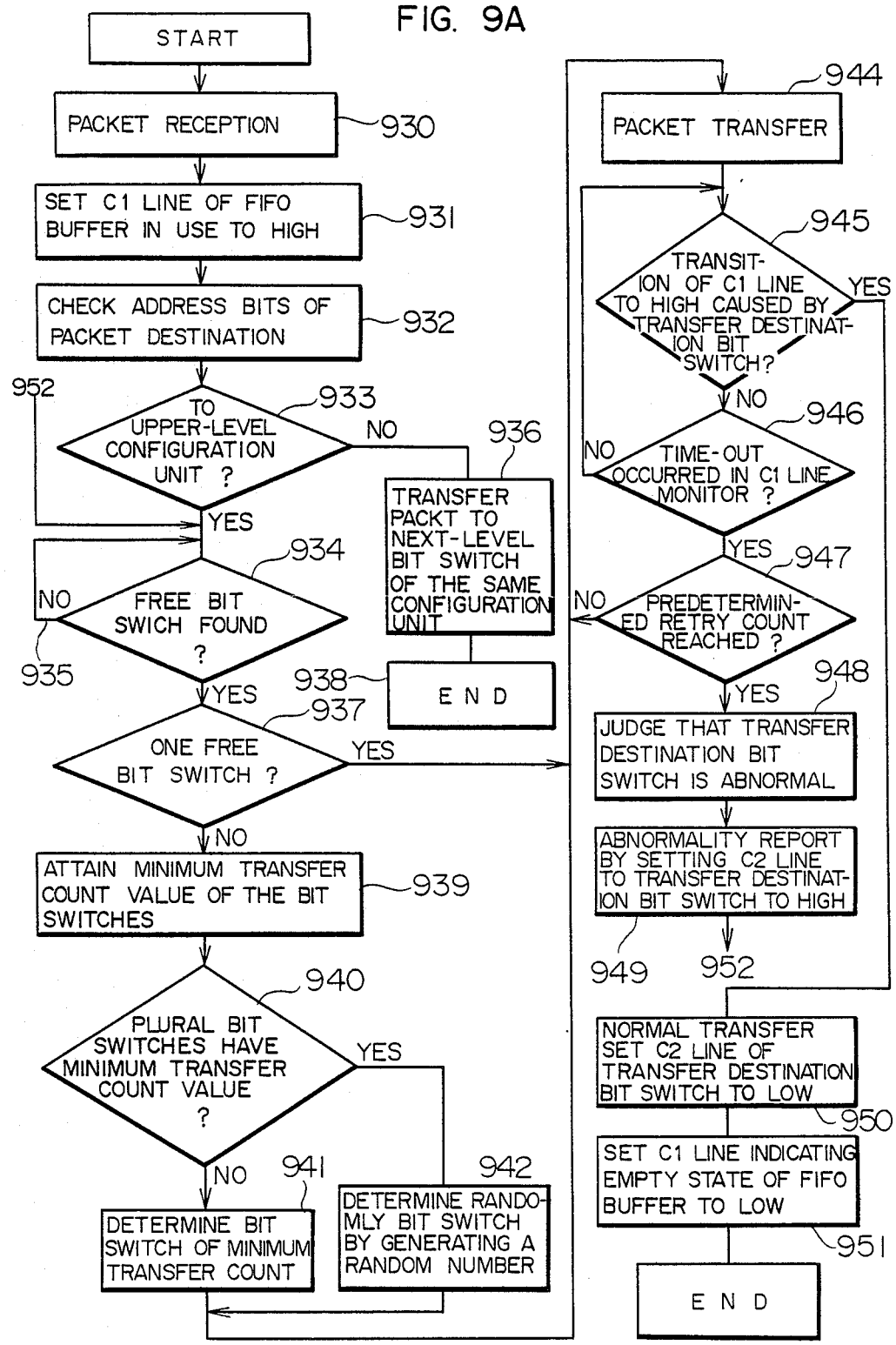
FIG. 9A is a flowchart showing a packet transfer control procedure on a transmission side.
Figure 9B:
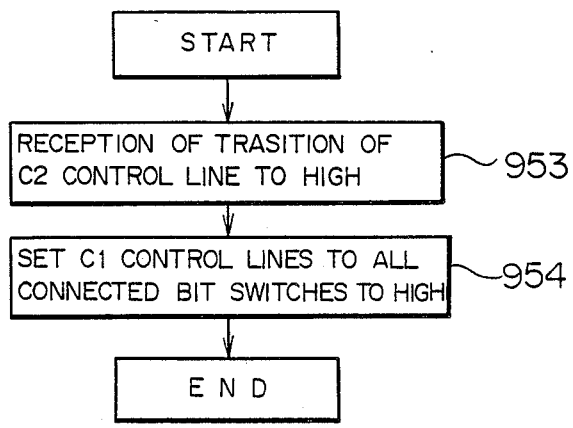
FIG. 9B is a flowchart showing a packet transfer control procedure on a reception side.

FIGS. 9A and 9B show the control method of bit switches 60 to 64 (on the packet transmission side) of FIG. 8. As shown in FIG. 10, the bit switch is provided with a first-in first-out (FIFO) buffer 971 such that a packet transfer is not initiated until a transfer enable signal C1 984 is received from a bit switch at the next level associated with the packet destination. More concretely, in FIG. 8, let us consider a case where the bit switch 62 (the same result occurs also for the bit switch 60, 61, 63, or 64) receives a data packet from a bit switch (the bit switch 61 in this case) at the previous level in association with a processing block 930 of FIG. 9A. The C1 control signal is turned on to indicate a condition that the FIFO buffer is in use to the bit switch 61 at the previous level. In a block 931, the C1 line disposed for the control signal transmission is set to High when the C1 control signal is on. Next, a processing block 932 judges a particular bit (the third bit relative to the upper-most bit in the bit switch 62) of the subscriber address contained in the header portion of the data packet to determine whether or not the packet is to be transferred to a configuration unit at the higher level depending on the result of the judgement. Namely, since the data packet is to be sent to a configuration unit at the higher hierarchic level if the third bit is 1 in FIG. 8, the data packet is transferred to the bit switch 67 or 68. On the other hand, if the data packet is not to be sent to a configuration unit at the higher hierarchic level, a processing block 936 transfers the data packet to the bit switch 63.

When the data packet is to be sent to a configuration unit at the higher hierarchic level, it is necessary to determine the transfer of the data packet to one of the two bit switches 67 and 68 disposed to minimize the concentration of load. For this operation, transfer destination bit switches 67 and 68 so as to determine whether or not the FIFO buffer is empty in a processing block 934. If both of the two bit switches 67 and 68 are in use, the system enters a wait state in a processing block 935, namely, the packet transfer is not accomplished until one of the bit switches 67 and 68 becomes to be free. When one of the bit switches 67 and 68 is free, the packet is immediately transferred to the bit switch 67 or 68 in the available state. If both of the bit switches 67 and 68 are free, in order to effect the distribution of the load as a characteristic feature according to the present invention, a record of a transfer count value is calculated as follows. Namely, by use of the operation that the C1 control line is turned on (High) every time each transfer source bit switch receives a packet, the transfer source bit switch calculates the transfer count value from the count of on and off operations of the C1 control line associated with the transfer destination bit switch. That is, in order for the bit switch 62 to record the transfer count value with respect to the bit switch 67, since the C1 control line turns on each time a packet is transferred from one of the bit switches 60 to 64 to the bit switch 67, the bit switch need only check the count value thus attained. The bit switch 62 can obtain the transfer count value with respect to the bit switch 68 in the similar fashion. As a result, each of the bit switches 60 to 64 can recognize the transfer count values with respect to the bit switches 67 and 68 without effecting any particular data communication therebetween.

Assume here that the bit switch 62 compares the transfer count of the bit switch 67 with that of the bit switch 68 and that the transfer count value of the bit switch 67 is found to be smaller than that of the bit switch 68. In this case, the utilization count of the bit switch 67 is less than that of the bit switch 68. As described above, a packet data transmission route having a marginal transfer capacity is selected in any case so as to prevent a possibility that a blocking condition takes place in a switching route subsequent to the transfer destination, thereby uniforming the load imposed on the respective bit switches. Although two transfer destination bit switches are arranged for the redundancy configuration (duplicated system) in this embodiment, three or four transfer destination bit switches may be disposed in the redundant constitution. In general, a bit switch is selected from n transfer destination bit switches as follows. Namely, the minimum value is first determined among the transfer count values with respect to the respective bit switches in a processing block 939. If the minimum value is associated with two bit switches or more, a processing block 942 selects one of the bit switches in a random fashion. If the minimum value is associated with only one bit switch, it is determined in a processing block 941 to effect the transfer operation to the pertinent bit switch.

Next, description will be given of the control to be effected in a case where, for example, the transfer destination bit switch is in a failed state or the connecting line thereto is interrupted.

In a case where the connecting line to the bit switch as the transfer destination is failed, even when a packet transfer is attempted in a processing block 944, a state transition to the on (High) state does not takes place in the C1 control line associated with the transfer destination bit switch. To cope with this situation, a processing block 944 monitors the C1 control line for a predetermined period of time, and if the C1 control line does not turn on when the period of time is elapsed, the packet transfer is effected again. If the C1 control line is not set to the on state after several attempts of the packet transfer, a processing block 948 determines that an abnormality exists in the transfer destination bit switch or the connecting line, and then a processing step 949 notifies the abnormal condition to the transfer destination bit switch by turning the C2 control line on. Incidentally, the C2 control line is assumed to be possessed by the bit switches 67 and 68 associated with the multiple connecting lines. Thereafter, a search is conducted again for a free bit switch as the transfer destination by use of the signal 952.

When a bit switch receives the signal 952 designating an abnormality report 949 indicated by the on state of the C2 control line, a processing block 954 immediately causes the bit switch to turn the C1 control line on so as to take a procedure prohibiting the packet transfer from any bit switches connected thereto as shown in FIG. 9B. On the other hand, when the packet transfer is normally achieved through a state transition of the C1 control line to the on state, a processing block 950 turns the C2 control line to the transfer destination bit switch off, and then a processing block 951 turns the C1 control line off so as to notify the completion of the packet transfer to the bit switch at the preceding level.

Next, description will be given of a case where the control lines C1 and C2 are interrupted. When the control line C1 is failed, a state of a high impedance takes place. The bit switches treat this state in the same fashion as for the on state. Namely, it is judged that the FIFO buffer of the bit switch to which the control line C1 is connected is in use and hence the packet transfer thereto is not achieved such that a procedure beginning from the processing block 934 is effected to search for a transfer destination bit switch.

When the control line C2 is interrupted, the bit switch checking the control line C2 assumes a reception of an abnormality report and hence turns all C1 control lines to the connected bit switches on so as to inhibit the reception of the transfer packet after this point.

As described above, in any case of the failure in the control lines, the failed location can be localized, which leads to the characteristic of the present invention that the data reliability is retained.

FIG. 10 is a schematic hardware diagram of a bit switch according to the present invention. When a data packet from a bit switch at the previous level is received by a packet receiving circuit 970, a C1 control line 83 to the bit switch at the previous level is immediately turned on. Next, the data packet is passed via a line 976 to an FIFO buffer 971 and then a particular bit of the subscriber address is read via a line 977 into a bit judge circuit 972. Furthermore, the state of the FIFO buffer of the transfer destination bit switch is checked by an empty/full check circuit 973 by use of a C1 control line 984. In addition, the circuit 973 includes a transfer counter continuously keeping the on transition count value of each C1 control line 984, and hence a route selecting circuit 972 can read the count value via the line 979. After the route is determined, the route selecting circuit 972 sends an instruction via a line 980 to a switch and switch control section 972, and then the packet data of the FIFO buffer is transferred, via the line 978, the switch and switch control section 974, and the line 980, from the packet transmitting circuit 975 to a bit switch at the next hierarchic level. After the packet data is transferred, when a normal transfer is confirmed by the check circuit 973, a signal 985 is issued to release the FIFO buffer and the C1 control line 983 to the bit switch at the previous level is turned off.

Incidentally, redundant bit switches such as the bit switches 67 and 68 associated with the multiple connecting lines are respectively provided with a C2 control line 982 to receive an abnormality report, and when the C2 control line 982 is turned on, a packet receiving circuit 970 turns the C1 control lines 983 to all bit switches at the previous level on. The hardware operations of the bit switches have been described above.

A characteristic constitution of the present invention resides in that a configuration unit includes a portion of an anterior judgement of a subscriber address of a received packed and a portion of a posterior judgement thereof. The anterior judge portion or section judges to determine whether or not the destination subscriber of the packet exists in the subscribers at a level below the pertinent configuration unit, and if this is the case, the posterior judge section determines configuration unit at the low level accommodating the destination subscriber; otherwise, the packet is transferred to a configuration unit at the next higher level for the judgement of the destination subscriber. Consequently, for example, for a telephone communication or the like having a high traffic between locations apart from each other by a short distance, when compared with a network constitution method like the conventional omege network in which the same number of judgement and switching operations are achieved for all destination subscribers, the number of configuration units to be passed is reduced in a short-distance communication (for example, 5a of FIG. 1C) according to this method; consequently, the number of judgement and switching operations is minimized and the transfer delay is reduced.

On the other hand, however, the hierarchic structure of the constitution according to the present invention has a tendency that the concentration of load becomes higher for the configuration unit at the higher level. It is therefore required to adopt a transfer control method which prevents a deterioration of the data reliability due to a packet data blocking, data loss, and a data error which may be caused by the concentration of load. In the transfer control method of the bit switches employed according to the present invention, the packet transfer is not achieved until the FIFO buffer of the transfer destination becomes to be free or empty; furthermore, for the bit switches connected to a configuration unit at the higher level associated with an anterior judge section on which the concentration of load may take place (for example, 23 of FIG. 4A and 65 of FIG. 4C), the load distribution is effected depending on the result of an operation to monitor the transfer count and the transfer abnormality processing are effected, thereby increasing the data reliability.

According to the present invention, there are attained the following effects.

(I) Since the number of levels in the hierarchic structure of the packet switching modules and the number of stages or levels of the bit switches in the packet switching module can be readily increased, a network can be constituted with a high expandability. Since the network call control is omitted from the control of the bit switch so as to effect the packet transfer by means of the hardware and firmware, the conventional processing performance of $10^4$ packets per second can be increased to $10^6$ packets per second.

(II) According to the packet transfer control method of bit switches as basic elements in the configuration unit having the packet switching function, the processing constituted with the following operations is executed by means of the hardware, which enables a high-speed packet transfer control with a high reliability.

(1) The packet transfer is effected after a receiving FIFO buffer of the transfer destination bit switch is confirmed to be free, and hence a packet loss and a packet error are prevented.

(2) A redundant configuration is adopted for a bit switch having a high load so as to dispose a plurality of bit switches, thereby minimizing the load.

(3) A packet transfer is achieved such that the loads imposed on the plural bit switches of (2) above become to be uniform.

(4) In a case where an abnormality occurs in a packet transfer to one of the plural bit switches of (2) above, the packet transfer is attempted again to another bit switch considered to be in the normal state.

While the present invention has been described with reference to particular illustrative embodiments, it is not restricted by those embodiments but only by the appended claims. It is to be appreciated that those skilled in the art can change and modify the embodiments without departing from the scope and spirit of the present invention.

We claim:

1. A packet switching equipment connected to a plurality of terminals or other packet switching equipment by plurality of first transmission line means, each of said plurality of first transmission line means having a pair of an input line and an output line, wherein a packet received from the input line of one first transmission line means is sent out to the output line of another first transmission line means in accordance with a destination address contained in the packet, said packet switching equipment comprising:

a plurality of switch units connected in a hierarchy configuration having a least first and second levels, said first level including a plurality of first switch units each connected to a group of said first transmission line means, said second level including a single second switch unit connected to said plurality of first switch units respectively by a plurality of second transmission line means, each of said plurality of second transmission line means having a second pair of an input line and an output line, wherein, each of said plurality of first switch units includes:

anterior judging means having a plurality of bit switches coupled so as to selectively output the packet to the output line of one of said second transmission line means or a third signal line in accordance with a content of a first part of an address in the packet received from each input line of said group of said first transmission line means, and posterior judging means having a plurality of bit switches coupled so as to selectively output the packet to any output line of said group of said first transmission line means in accordance with a content of a second part of the address in the packet received from said third signal line or the output of said second transmission line means, wherein, said single second switch unit includes a plurality of bit switches coupled so as to selectively output the packet received from the input line of each said second transmission line means to the output line of any another one of said second transmission line means in accordance with the content of the first part of the address of the packet.

2. A packet switching equipment according to claim 1, wherein said anterior judging means includes first and second stages, said first stage having a plurality of bit switches for selectively outputting the packet received from the input line of said first transmission line means to the input line of said second transmission line means or a fourth signal line in accordance with a first high-order bit of the address of the packet, and said second stage having at least one bit switch for selectively outputting the packet received from said fourth signal line to said third signal line of the input line of said second transmission line means in accordance with a second high-order bit of the address of the packet.

3. A packet switching equipment according to claim 2, wherein said posterior judging means includes first and second stages, said first stage having at least one bit switch for selectively outputting the packet received from said third signal line to a fifth signal line or a sixth signal line in accordance with a third high-order bit of the address of the packet, and said second stage having at least one bit switch for outputting the packet received from said fifth signal line to the output line of any one of said plurality of first transmission line means in accordance with a fourth high-order bit of the address of the packet, and having a bit switch for outputting the packet received from said sixth signal line to the output line of any one of said plurality of first transmission line means in accordance with the fourth high-order bit of the address of the packet.

4. A packet switching equipment according to claim 1, further comprising:

at least one third switch unit connected to a plurality of terminals or other packet switching equipments by a plurality of third transmission line means each having a pair of input line and output line, and connected to one of said plurality of first switch units by said first transmission line, said third switch unit including anterior judging means having a plurality of bit switches coupled so as to selectively output the packet received from the input line of said third transmission line means to the input line of said first transmission line means or a fourth signal line in accordance with contents of said first and second parts of the address of the packet, and posterior judging means having a plurality of bit switches coupled so as to selectively output the packet received from said fourth signal line or the output line of said first transmission line means to the output line of any one of said plurality of third transmission line means in accordance with a content of a third part of the address of the packet.

5. A packet switching method for a packet switch network which is configured with bit switches wherein each of said bit switches as a FIFO buffer for receiving a packet and connects to said FIFO buffer of at least another bit switch via a control line and a transferring line and combines with each other bit switches so as to form a tree structure, said packet switching method comprising the steps of: a processing of monitoring, via said control line, an empty state of the FIFO buffer of the next-stage bit switch which is transfer destination indicated by an address on a packet when a bit switch received said packet via said transferring line, and transferring said received packet to said next-stage bit switch only when said FIFO buffer is empty;

a processing of counting each number of packets transferred to each next-stage bit switches, when there are at least two bit switches of transfer destination indicated by an address on said packet;

a processing of transferring said packet to said next-stage bit switch of which said number is smallest;

a processing of monitoring a condition whether a next-stage bit switch of which said number is smallest has normally received said packet or not for a predetermined period and transferring a copy of said packet to said next stage bit switch again if said condition is abnormal; and, a processing of outputting an abnormality report by said next-stage bit switch so as to prohibit the other bit switches to transfer a packet to said next-stage bit switch of which condition is abnormal 6. A packet switch network comprising:

a plurality of bit switch means wherein each of said bit switch means has a FIFO buffer for receiving a packet and connects to said FIFO buffer of at least one bit switch means via a control line and a transferring line and combines with each other bit switch means so as to form a tree structure, wherein said bit switch means including means for monitoring, via and control line, an empty state of the FIFO buffer of a next-stage bit switch means which is transfer destination indicated by an address on a packet when a bit switch means received from said packet via said transferring line, and transferring said received packet to said next-state bit switch means only when said FIFO buffer is empty;

means for counting each number of packets transferred to each net-stage bit switch means when there are at least two bit switch means of transfer destination indicated by an address on said packet;

means for transferring said packet to said next stage bit switch means of which said number is smallest;

means for monitoring a condition whether a next stage bit switch of which said number is smallest has normally received said packet or not for a predetermined period and transferring a copy of said packet to said next-stage vit switch means again if said condition is abnormal; and, wherein said next-stage bit switch includes means for outputting an abnormality report so as to prohibit the other bit switch means to transfer a packet to said next stage bit switch means in the abnormal condition.

* * * * *

UNITED STATES PATENT AND TRADEMARK OFFICE
CERTIFICATE OF CORRECTION

PATENT NO. : 4,876,681

DATED : October 24, 1989

INVENTOR(S) : Masayoshi Hagiwara, et al.

It is certified that error appears in the above-identified patent and that said Letters Patent is hereby corrected as shown below:

Claim 1, column 17, line 4, after "by", insert --a--.

Claim 1, column 17, line 13, delete "a" and insert therefor --at--.

Claim 5, column 18, line 36, delete "as" and insert therefor --has--.

Claim 6, column 19, line 5, delete "and" and insert therefor --said--.

Claim 6, column 19, line 16, delete "net-stage" and insert therefor --next-stage--.

Claim 6, column 20, line 3, delete "next stage" and insert therefor --next-stage--.

Claim 6, column 20, line 9, delete "vit" and insert therefor --bit--.

Claim 6, column 20, line 14, delete "next stage" and insert therefor --next-stage--.

Signed and Sealed this

Sixth Day of November, 1990

Attest:

HARRY F. MANBECK, JR.

*Attesting Officer*    *Commissioner of Patents and Trademarks*